United States Patent [19]
Lietar

[11] 3,817,626
[45] June 18, 1974

[54] OPTICAL ARRANGEMENT FOR COMPARING THE VISUAL CHARACTERISTICS OF SIMILAR OBJECTS

[75] Inventor: Christian Lietar, Morges, Switzerland

[73] Assignee: Robert Bosch GmbH, Stuttgart, Germany

[22] Filed: Mar. 13, 1973

[21] Appl. No.: 340,819

[30] Foreign Application Priority Data
Mar. 14, 1972   Germany............................ 2212159

[52] U.S. Cl.................... 356/168, 356/172, 350/30
[51] Int. Cl. ................................................ G01b 11/00
[58] Field of Search ............. 356/168, 165, 172, 71; 350/30

[56] References Cited
UNITED STATES PATENTS
| | | | |
|---|---|---|---|
| 3,586,448 | 5/1970 | Beasse | 356/172 |
| 3,684,384 | 8/1972 | Hoto et al. | 356/168 X |
| 3,712,740 | 1/1973 | Hennings | 356/172 X |

Primary Examiner—Ronald L. Wibert
Assistant Examiner—Paul K. Godwin
Attorney, Agent, or Firm—Michael S. Striker

[57] ABSTRACT

An arrangement for comparing the visual characteristics of two similar or substantially identical objects includes a first optical unit arranged for forming from an object located at a predetermined first object location a first image located at a predetermined image location. A second optical unit is arranged for forming from an object located at a predetermined second object location a second image located at a predetermined image location. A third optical unit is arranged for forming said first and second images real and coincident respective third and fourth images. The first and second images may be coincident virtual images. The arrangement is particularly adapted for comparing the configurations of masks used in the fabrication of integrated circuits from wafers of semi-conductor material.

12 Claims, 3 Drawing Figures

OPTICAL ARRANGEMENT FOR COMPARING THE VISUAL CHARACTERISTICS OF SIMILAR OBJECTS

BACKGROUND OF THE INVENTION

It is necessary in certain circumstances to compare in as precise a manner as possible the visual characteristics of two objects. This is in particular a necessity in comparing the configurations of masks used in the fabrication of integrated circuits from wafers of semiconductor material.

An optical arrangement is already known for forming from two such similar masks, or other such similar objects, two superimposed virtual images. However, the known arrangement is disadvantageous in various respects, particularly in so far as the possibility of subsequent magnification of the superimposed virtual images is concerned.

SUMMARY OF THE INVENTION

It is the general object of the present invention to provide a method and an optical arrangement which can be used for comparing the visual characteristics of two similar objects, and in particular for comparing the visual characteristics of two similar or substantially identical masks of the type used in the fabrication of integrated circuits from wafers of semiconductor material.

This object, and others which will become more understandable from the following description, can be met according to the invention by an arrangement for comparing the visual characteristics of two similar objects, particularly masks used in the fabrication of integrated circuits, which briefly stated comprises first optical means arranged for forming from an object located at a predetermined first object location a first image located at a predetermined image location. The arrangement also includes second optical means arranged for forming from an object located at a predetermined second object location a second image located at a predetermined image location, and third optical means arranged for forming from said first and second images real and coincident respective third and fourth images. The first and second optical means just mentioned may advantageously be so arranged that the first and second images just mentioned are coincident virtual images.

The novel features which are considered characteristic for the invention are set forth in particular in the appended claims. The invention itself, however, both as to its construction and its method of operation, together with additional objects and advantages thereof, will best be understood from the following description of specific embodiments, when read in connection with the accompanying drawing.

DESCRIPTION OF THE PREFERRED EMBODIMENTS

Figure 1:
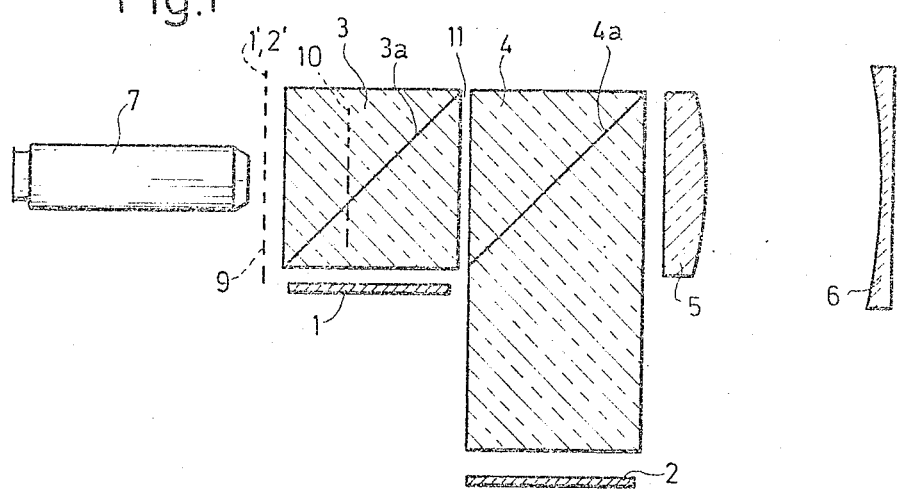
FIG. 1 illustrates a first embodiment of the invention.

FIG. 1 illustrates a first embodiment of the present invention. The arrangement shown in FIG. 1 is used to compare the visual characteristics of two masks 1 and 2 of the type employed for the fabrication of integrated circuits from wafers of semiconductor material using etching techniques.

The optical arrangement itself includes a prismatic body 3 of refracting material, such as glass or any other conventional refracting material, and a further prismatic body 4. Located in the interior of prismatic body 3 is a layer $3a$ of semi-transmissive reflective material, constituting a semi-transmissive mirror. Similarly, located in the interior of prismatic body 4 is a layer $4a$ of semi-transmissive reflective material, constituting another semi-transmissive mirror.

Positioned at some distance to the right of the illustrated prisms is a concave spherical mirror designated by reference numeral 6, and intermediate the mirror 6 and the prisms 3 and 4 there is arranged a lens system shown as a planoconvex lens 5. A microscope object glass 7 is illustrated, to indicate that a microscope or other equivalent magnifying means may form part of the arrangement.

The manner in which the arrangement shown in FIG. 1 performs is as follows:

Light rays from mask 1 travel upwardly (as seen in FIG. 1) until they reach semi-transmissive mirror $3a$. These light rays are then in part transmitted further in vertical direction, and are lost to free space, and are in part reflected by mirror $3a$. The reflected rays travel in rightwards direction (with respect to the drawing) towards the spherical mirror 6, through the refracting material of prisms 3 and 4 and through the lens 5.

As will be readily appreciated, the mirror $3a$ causes formation of a virtual image of the mask 1 located in a vertical plane to the left of the mirror $3a$. Ignoring, for the moment, the provision of lens 5, this virtual image can be viewed from the location at which spherical concave mirror 6 is positioned. Due to the presence of prismatically configured refracting material intervening between the virtual image formed by mirror $3a$ and the viewing point at which mirror 6 is located, the virtual image of mask 1 formed by mirror $3a$ will appear to be located in the plane 10, when viewed from the location at which the mirror 6 is located, still ignoring the provision of lens 5.

It will be noted that the plane 10 intersects the mirror $3a$, so that evidently a portion of the virtual image formed by mirror $3a$ may, incorrectly, be thought to lie in front of the mirror producing the virtual image of mask 1. It is of course impossible for a virtual image produced by a plane mirror to lie in front of the mirror producing the virtual image. However, as explained above, the virtual image of mask 1 first produced by mirror $3a$ lies in its entirety behind (leftwards of) mirror $3a$. The virtual image of mask 1 appearing in plane 10 is a virtual image distinct from that formed initially by mirror $3a$ alone, and is derived from the first-formed virtual image of mask 1 by providing the refracting material of prisms 3 and 4 intermediate the first-formed virtual image of mask 1 and the viewing point at which mirror 6 is located. The provision of lens 5 is still being ignored, for the sake of simplicity, and because lens 5 plays only a secondary role in the arrangement.

A virtual image of mask 2 located in plane 10, i.e., coincident with the virtual image of mask 1, is produced in substantially the same manner as is the virtual image of mask 1. Specifically, light rays from mask 2 travel upwardly (as seen in FIG. 1) until they encounter semi-transmissive mirror 4a. The reflected portion of the light rays arriving at mirror 4a from mask 2 travel in rightwards direction towards spherical concave mirror 6. In the ordinary way, mirror 4a forms from mask 2 a virtual image of the mask 2 located behind the image-forming mirror 4a (leftwards of the mirror 4a, in the drawing). The first-formed virtual image of mask 2 is made to fall in the same plane as the first-formed virtual image of mask 1, namely in a plane located leftwardly of mirror 3a and leftwardly of plane 10. The first-formed virtual image of mask 2 is made to fall in such plane simply by appropriately selecting the distance between the semi-transmissive mirror 4a and the object location at which mask 2 is positioned.

As just mentioned, the first-formed virtual image of mask 2 coincides with the first-formed image of mask 1 and both lie in a plane located leftwards of mirror 3a and leftwards of plane 10. However, again, the intervening presence of the refracting material of prisms 3 and 4 between these coincident virtual images and the viewing point at which mirror 6 is located, results in the formation of coincident virtual images derived from the first-formed coincident virtual images and located in plane 10. That is, when seen from the location at which mirror 6 is positioned, coincident virtual images of the masks 1 and 2 appear to be located in plane 10.

Still ignoring the provision of lens 5, concave spherical mirror 6 reflects the rightwards travelling light rays which seem to originate from the coincident virtual images located in plane 10. The light rays reflected by spherical concave mirror 6 travel in leftwards direction through prism 4 and then through prism 3 and form in plane 9 two real and coincident images 1', 2' of the masks 1 and 2. The production of coincident real images in plane 9 at a distance farther from mirror 6 than the source images in plane 10, results from the fact that mirror 6 is concave and spherical in configuration. It is well known that a concave spherical mirror can produce a real image located farther from the mirror than the source object (or source image), if the source object (or source image) is located at a suitable distance from the concave mirror—for instance located between the center of curvature of the mirror and the focal point of the mirror, in the special case that the incident and reflected rays travel only in free space.

The lens 5, which has thus far been ignored, is in fact provided only to improve the image quality of the coincident real images 1', 2' formed in plane 9, for example by counteracting to some extent the field curvature resulting whenever a spherical mirror reflects an object or image having dimensions comparable to those of the radius of the mirror itself. To a small extent, provision of the compensating lens 5 will actually contribute to the determination of the planes in which the various images, both real and virtual, appear. However, the role played by lens 5 is minor, and the determination of the locations of the various images depends primarily upon the other illustrated components of the optical arrangement shown.

It will be noted that the real and coincident images 1', 2' are located in free space, outside the refracting material of prisms 3 and 4. This is a very considerable advantage because the coincident real images 1', 2' are made readily accessible for a variety of purposes. If the coincident and real images 1', 2' are to be explored using a microscope 7 (of which only the object glass has been illustrated), then the microscope object glass can be brought as close to the images 1', 2' as may be necessary. It will be appreciated that ordinary, commercially available microscopes, and other magnifying instruments, are characterized by certain operating distances, measured with respect to the object glass of the magnifying instrument, at which an image or object to be magnified must be placed for focused magnification to occur. In the case of commercially available microscopes, for instance, the microscope object glass must be brought quite near to the object or image to be magnified, usually closer than one centimeter when high magnification is to be achieved. It will be self-evident that because the coincident real images 1', 2' produced by the arrangement shown in FIG. 1 are located in free space, the microscope object glass 7 can be brought as near to the images 1', 2' as may be necessary.

To make this advantage clearer, consider the possibility of exploring with a microscope the coincident virtual images lying in plane 10. In the first place, the coincident virtual images in plane 10 are not visible from the left side of the illustrated arrangement; they are visible only from the right side of the arrangement. If the concave spherical mirror 6 and the compensating lens 5 are removed, and if the microscope 7 is brought to the right side of the prism 4, the object glass of the microscope 7 cannot be brought near enough to the coincident virtual images in plane 10, because of the intervening presence of the refracting material of prisms 4 and 3. Even if the arrangement were modified to omit prisms 3 and 4, so that mirrors 3a and 4a would be located in free space, it is clear that a microscope object glass located rightwardly of mirror 4a could not be brought close enough to the plane of the virtual images formed due to the intervening presence of the image-producing mirrors 4a and 3a themselves. It will be appreciated, therefore, that by forming the coincident real images 1', 2' at the left-hand side of the arrangement and in free space, a very real and significant advantage is afforded, in so far as exploration of the superimposed images by means of a microscope or other high-power magnifying instrument is concerned.

The fact that the images 1', 2' are located in free space can have an additional advantage. It may be desired to photograph the coincident and real images 1', 2' for purposes of later study. Inasmuch as these images are located in free space, a photographic plate can easily be brought into such a position that the coincident real images 1', 2' fall exactly upon the photographic plate, making photographing of the superimposed images 1', 2' a particularly simple task. Likewise, if one of the masks 1 and 2 is omitted, the real image of the remaining mask formed in plane 9 may be used in processes for the printing of the image of a master mask onto a silicon wafer, with the wafer being so positioned that the image of the single mask employed is caused to fall exactly on the silicon wafer. Persons skilled in the art will readily appreciate that these advantages can result only when the coincident images produced are real, as are the images 1', 2', because virtual images cannot be made to fall upon a photographic plate or upon a silicon wafer to be etched, whereas real images can be formed upon such surfaces.

The advantageousness of forming the real images 1', 2' in free space (as at plane 9) has just been explained. However, in so far as the advantage of accessibility for a microscope objective is concerned, the formation of a real image in free space is not absolutely necessary. For example, the coincident real images of masks 1 and 2 could be formed exactly in the plane of the left-hand surface of prism 3. The microscope objective 7 could still be brought as near to the coincident real images as might be required for purposes of focused magnification. To shift the coincident real images 1', 2' so that they are formed exactly in the plane of the left-hand surface of prism 3, it is only necessary to shift the position of the spherical mirror 6 and/or to employ a mirror having a different radius of curvature. To shift the coincident real images 1', 2' farther to the right, the mirror will have to be shifted farther to the right or replaced by a mirror having a smaller radius of curvature.

Furthermore, in so far as the advantage of accessibility of the images for a microscope object glass is concerned, it would even be possible to form the the coincident real images 1', 2' not in free space, but actually within the refracting material of prism 3, slightly rearwards of the left-hand surface of prism 3. The microscope object 7 could still be brought close enough to the plane of the images, if this plane is not too deeply located within the body of the prism. In this connection, it will be understood that the formation of coincident real images 1', 2' within the prism 3, as opposed to in free space or at the left-hand prism surface, results in the formation of virtual images derived from these coincident real images, and caused by the intervention of a thin layer of prism material between the left-hand surface of prism 3 and the plane within the prism 3 at which such coincident real images 1', 2' would be formed. When the coincident real images located within the prism 3 near the left-hand surface thereof would be viewed by the microscope objective 7, the layer of intervening prism material would cause the formation of coincident virtual images in a plane intermediate the plane of the left-hand surface of prism 3 and the plane at which such interiorly located coincident real images would be positioned. Thus the coincident real images located within the prism 3 would appear to objective 7 (or to a viewer's eye located at the position of objective 7) to be closer to the left-hand surface of prism 3 than the plane in which the coincident real images would actually be located. The important point, however, remains that the microscope objective could still be brought sufficiently close to the seeming plane of location of the coincident real images for purposes of focused magnification.

In so far as the arrangement shown in FIG. 1 is concerned, it will be understood that the semi-transmissive mirror 3a, together with the prism 3 and the upper portion (as seen in FIG. 1) of prism 4 (excluding the mirror 4a) constitute first optical means for forming a first virtual image of mask 1, the virtual image being located in plane 10. Similarly, the semi-transmissive mirror 4a together with prism 4 constitute second optical means for forming a second virtual image, namely a virtual image of mask 2 located in plane 10. Finally, the concave spherical mirror 6 and the compensating lens system 5, together with prism 3 (excluding mirror 3a) and the upper portion of prism 4 (excluding mirror 4a) constitute third optical means for forming from the first and second virtual images, both located in plane 10, coincident and real respective third and fourth images 1', 2' located in plane 9.

Figure 2:
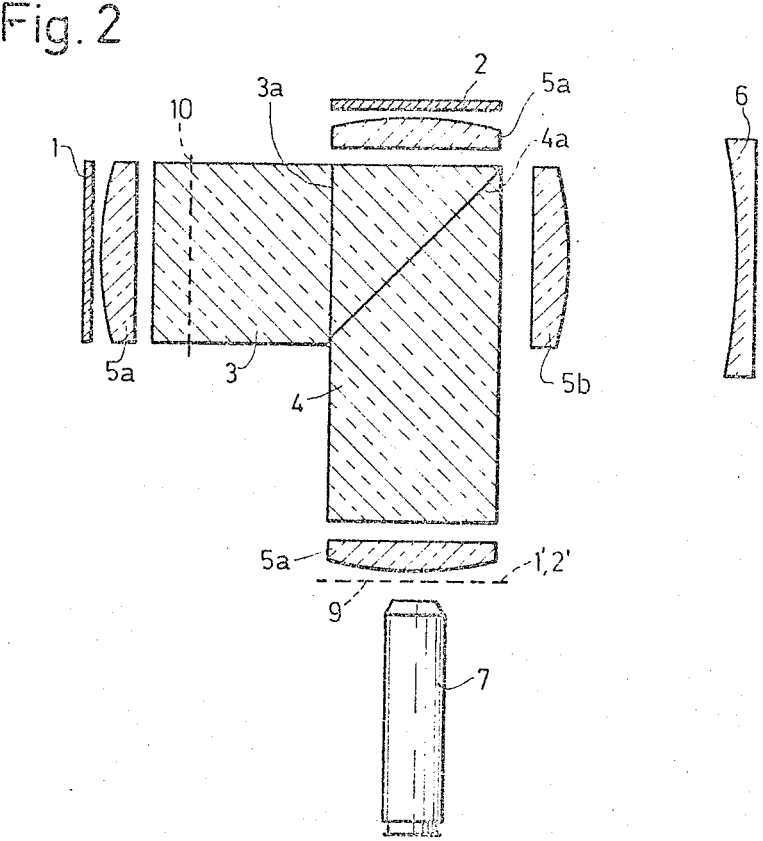
FIG. 2 illustrates a second embodiment of the invention.

FIG. 2 illustrates a second embodiment of the invention. Components corresponding to those shown in FIG. 1 are designated by the same reference numerals. The arrangement of FIG. 2 differs from that of FIG. 1 in the orientation of the semi-transmissive reflecting surface 3a and in the relative locations of the masks 1, 2 and the microscope objective 7.

The manner in which the arrangement of FIG. 2 performs will now be described. For purposes of simplicity, the presence of lens 5b, corresponding to lens 5 in FIG. 1, and also the presence of the three lenses 5a will at first be ignored.

Light rays travel in rightwards direction from mask 1 through prism 3 and through the upper portion of prism 4 towards concave spherical mirror 6. Because of the intervening presence of prismatically configurated refracting material between the mask 1 and the mirror 6, the mask 1 as "seen" by the mirror 6 will appear to be located in plane 10. In other words, the refracting material intervening between mask 1 and mirror 6 results in the formation of a virtual image of mask 1 located in plane 10. The light rays seemingly originating from plane 10 travel in rightwards direction until they encounter mirror 6. They are then reflected by mirror 6 and travel in leftwards direction until they encounter semi-transmissive mirror 4a. They are thereupon reflected by mirror 4a and travel in downwards direction (as seen in FIG. 2) through prism 4 and form a real image of mask 1 located in plane 9 and designated by numeral 1'.

A real image 2' of mask 2 is likewise formed in plane 9. Specifically, light rays originating from mask 2 pass in downward direction (as seen in the drawing) through prism 4 until they encounter mirror 4a. They are reflected by mirror 4a and thereupon travel in leftwards direction until they encounter mirror 3a. The light rays are then reflected by mirror 3a and travel in rightwards direction through the upper portion of prism 4 (as viewed in the drawing) and then towards the mirror 6. The light rays reflected from mirror 3a and travelling towards mirror 6 seem to originate from a mask located in plane 10. In other words, the mirror 4a, the mirror 3a and the refracting material intervening between the mirror 3a and the mirror 6 create a virtual image of mask 2 located in plane 10, the same plane in which is located the aforementioned virtual image of mask 1. So far as mirror 6 can "know," the rightwards travelling rays originating from mask 2 and reflected from mirrors 4a and 3a (in that order) originate from a mask located in plane 10, just as the rays originating from mask 1 seem to mirror 6 to originate from a mask located in the plane 10. Mirror 6 accordingly reflects the rays from the two masks in identical manner. The rays originating from mask 2 are reflected by mirror 6 and travel in leftwards direction until they encounter mirror 4a, are at that point reflected by mirror 4a and travel downwardly through prism 4 (as viewed in the drawing) and form a real image 2' of mask 2 coinciding with the real image 1' of mask 1.

The lens 5b, like the lens 5 of FIG. 1, is provided for purposes of compensation, and does not form an essential part of the illustrated arrangement, although it will of course contribute slightly to the determination of the locations of the various images produced. These remarks apply also to the additional three planoconvex compensating lenses 5a.

In the embodiment of FIG. 2, the real and coincident images 1', 2' are again located in free space, and result in the advantages discussed with respect to FIG. 1. As mentioned in the discussion of FIG. 1, the real and coincident images 1', 2' could alternatively be formed at exactly the outer boundary surface of the respective prismatic body of refracting material, namely at the lower boundary surface (as seen in the drawing) of prism 4 in FIG. 2. Similarly, the real coincident images 1', 2', as explained earlier with reference to FIG. 1, could also be formed within the prism 4 of FIG. 2, near the lower boundary surface of prism 4. These shifts in the location of the coincident real images 1', 2' can in FIG. 2, as in FIG. 1, be effected by shifting the mirror 6 and/or by employing a mirror 6 having a different radius of curvature.

Figure 3:
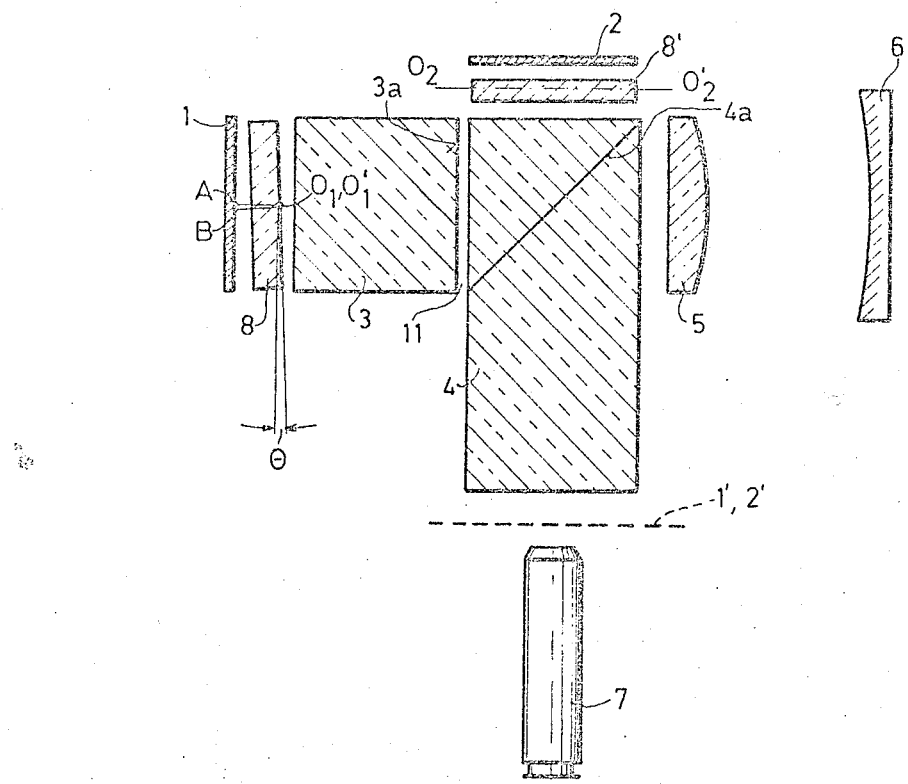
FIG. 3 illustrates a third embodiment of the invention.

The arrangement depicted in FIG. 3 is very similar to that shown in FIG. 2. The semi-transmissive mirror layer 3a again forms an angle of 45° with respect to the semi-transmissive mirror layer 4a. The prisms 3 and 4 are separated, however, by a small air gap 11, and the compensating lenses 5a of FIG. 2 have been removed. The most important difference between FIGS. 2 and 3 is the provision in FIG. 3 of two pivotably mounted glass plates 8 and 8' in front of the two masks 1 and 2. The two major surfaces of each of the two plates 8 and 8' are parallel. The glass plate 8 is mounted for rotation about an axis $O_1$, $O_1'$ extending in direction normal to the plane of the drawing. The glass plate 8' is mounted for rotation about an axis $O_2$, $O_2'$ lying in the plane of the drawing. The real images 1', 2' of the masks 1 and 2 will again be formed in free space, as in FIG. 2, and will again be formed in the same plane.

The pivotably mounted glass plates 8 and 8' are provided to ensure that the images 1', 2' of the masks 1 and 2 can be made to exactly coincide, without having to move the masks 1 and 2 themselves. For example, if plate 8 is rotated through an angle θ, as shown in the drawing, the entire real image 1' will become shifted or translated by a distance equal to the distance AB by which the mask itself would have to be shifted to effect a similar translation of the image, absent the provision of the rotary glass plate 8. Because the axes of rotation of the two glass plates 8, 8' are perpendicular to each other, rotation of both glass plates results in relative translations of the two real images 1', 2' in two mutually perpendicular directions. It is thus possible to obtain exact registration of identical portions of the real images 1', 2' independently of the relative positions of the masks 1 and 2 themselves.

If during comparison of the masks 1 and 2 the viewer observes that corresponding elements of the two masks are not in registry, he can effect registration by rotation of one or both of the rotatable glass plates 8, 8'. If desired, the (non-illustrated) mounting means for pivotably mounting the plates 8, 8' can include a movable indicator and a calibrated dial, so that the extent of rotation of the glass plates 8 and 8' can be exactly determined. The extent of rotation of the glass plates 8, 8' necessary to effect registration of unregistered corresponding elements of two masks is indicative of the extent to which the unregistered elements are out of registry, and this information may be useful in certain situations. The (non-illustrated) calibrated dial may advantageously be calibrated in units directly indicative of the extent of non-registry associated with a particular compensating rotation of the respective glass plate 8 or 8', rather than in actual degrees of rotation of the glass plate. Such indications of the lack of registry are exact, because the thin glass plates act like a reduction gear. Also, a single registration operation will suffice for each dimension, whereas cross-hair type registration expedients (an alternative possibility) usually involve two registration operations for each dimension. If a cross-hair registration expedient is employed, the cross-hairs must be brought into registration with the two associated elements in two separate registering operations.

The glass plates 8, 8' are so arranged that light rays originating from the masks 1 and 2 are translated before such light rays ultimately reach the microscope 7 and, accordingly, the correspondence between the rotation of the glass plates and the extent of non-registry of two images to be brought into registry is independent of the magnification afforded by the microscope.

The use of an objective comprised of lens system 5 and a concave mirror 6, is advantageous in several respects. It provides a particularly satisfactory compensation for chromatic and astigmatic aberrations. Also, despite the necessary high numerical opening and the rather large image field, it permits space-saving design for the arrangement and minimizing of the number of lenses employed. It is also possible for the entrance pupils to be sufficiently shifted away from the masks to avoid the errors due to different magnifications which result when the masks 1 and 2 are not positioned optimally in the predetermined planes of best focus.

It will be understood that each of the elements described above, or two or more together, may also find a useful application in other types of constructions differing from the types described above.

While the invention has been illustrated and described as embodied in an optical arrangement for comparing two similar or nearly identical objects, it is not intended to be limited to the details shown, since various modifications and structural changes may be made without departing in any way from the spirit or concept of the present invention.

Without further analysis, the foregoing will so fully reveal the gist of the present invention that others can by applying current knowledge readily adapt it for various applications without omitting features that from the standpoint of prior art constitute essential characteristics of the generic or specific aspects of this invention and, therefore, such adaptations and modifications should and are intended to be comprehended within the meaning and range of equivalence of the following claims.

What is claimed as new and desired to be protected by Letters Patent is set forth in the appended claims:

1. An arrangement for comparing the visual characteristics of two similar objects, particularly masks used in the fabrication of integrated circuits from wafers of semiconductor material, comprising, in combination: first optical means arranged for forming, from an object located at a predetermined first object location, a first image located at a predetermined image location; second optical means arranged for forming, from an object located at a predetermined second object location, a second image located at a predetermined image location; and third optical means arranged for forming, from said first and second images, real and coincident respective third and fourth images, said third optical means comprising a concave mirror positioned to receive and reflect said first and second images to form focussed real and coincident images constituting said third and fourth images.

2. An arrangement as defined in claim 1, wherein said first optical means comprises means arranged for forming from an object located at said first object location a virtual image constituting said first image, and wherein said second optical means comprises means arranged for forming from an object located at said second object location a virtual image constituting said second image.

3. An arrangement as defined in claim 1, wherein said first optical means comprises means arranged for forming from an object located at said first object location a virtual image constituting said first image, and wherein said second optical means comprises means arranged for forming from an object located at said second object location a virtual image coincident with said first image and constituting said second image.

4. An arrangement as defined in claim 1, wherein said concave mirror is a spherical concave mirror.

5. An arrangement as defined in claim 1, wherein at least one of said optical means comprise at least one prismatic body of refracting material intervening between said coincident virtual images and said concave mirror.

6. An arrangement as defined in claim 1, wherein at least one of said first, second and third optical means comprises a prismatic body of refracting material, and wherein said coincident real images are located in free space and not within said refracting material.

7. A method as defined in claim 1, and further including a magnifying instrument for magnifying said coincident real images.

8. An arrangement for comparing the visual characteristics of two similar objects, particularly masks used in the fabrication of integrated circuits from wafers of semiconductor material, comprising in combination: first optical means arranged for forming, from an object located at a predetermined first object location, a first image located at a predetermined image location; second optical means arranged for forming, from an object located at a predetermined second object location, a second image located at a predetermined image location; and third optical means arranged for forming, from said first and second images, real and coincident respective third and fourth images, wherein at least one of said first, second and third optical means comprises a prismatic body of refracting material having an outer boundary surface; and further including a magnifying instrument including an object glass and having a predetermined operational distance measured with respect to said object glass at which an object or image to be magnified must be located for said magnifying instrument to form a focused magnified image of such object or image to be magnified, andd wherein said coincident real images are located within said refracting material at such a distance from said outer boundary surface that the refracting material intervening between said outer boundary surface and said coincident real images results in the formation of two derived coincident virtual images visible from a location outside said refracting material in the vicinity of said boundary surface and located within said refracting material at a distance from said boundary surface no greater than said operational distance of said magnifying instrument, so that said derived coincident virtual images can be explored by said magnifying instrument.

9. An arrangement for comparing the visual characteristics of two similar objects, particularly masks used in the fabrication of intergrated circuits from wafers of semiconductor material, comprising in combination: first optical means arranged for forming, from an object located at a predetermined first object location, a first image located at a predetermined image location; second optical means arranged for forming, from an object located at a predetermined second object location, a second image located at a predetermined image location; and third optical means arranged for forming, from said first and second images, real and coincident respective third and fourth images, wherein at least one of said first, second and third optical means comprises a prismatic body of refracting material having an outer boundary surface constituting an interface between refracting material and free space, and wherein said coincident real images are located substantially coincident with said outer boundary surface.

10. An arrangement for comparing the visual characteristics of two similar objects, particularly masks used in the fabrication of integrated circuits from wafers of semiconductor material, comprising in combination: first optical means arranged for forming, from an object located at a predetermined first object location, a first image located at a predetermined image location; second optical means arranged for forming, from an object located at a predetermined second object location, a second image located at a predetermined image location; and third optical means arranged for forming, from said first and second images, real and coincident respective third and fourth images, wherein at least one of said first, second and third optical means comprises a prismatic body of refracting material having an outer boundary surface constituting an interface between refracting material and free space, and wherein said coincident real images are located within said refracting material.

11. An arrangement for comparing the visual characteristics of two similar objects, particularly masks used in the fabrication of integrated circuits from wafers of semiconductor material, comprising in combination: first optical means arranged for forming, from an object located at a predetermined first object location, a first image located at a predetermined image location; second optical means arranged for forming, from an object located at a predetermined second object location, a second image located at a predetermined image location; and third optical means arranged for forming, from said first and second images, real and coincident respective third and fourth images; and further including registering means comprising a first pivotably mounted plane-parallel plate of refracting material located in the path of light rays travelling towards said first optical means from an object located at said first object location and so arranged that rotation of said first plate effects translation of such light rays in a sense producing relative translation between said real images in a predetermined first direction, and a second pivotably mounted plane-parallel plate of refracting material located in the path of light rays travelling towards said second optical means from an object located at said second object location and so arranged that rotation of said second plate effects translation of such light rays in a sense producing relative translation between said real images in a predetermined second direction perpendicular to said first direction.

12. An arrangement for comparing the visual characteristics of two similar objects, particularly two masks of the type used in the fabrication of integrated circuits from wafers of semiconductor material, comprising in combination: optical means arranged for forming, from an object located at a predetermined first object location, a first real image located at a respective predetermined image location; additional optical means arranged for forming, from an object located at a predetermined second object location, a virtual image located at a respective predetermined image location; and further optical means arranged for forming, from said virtual image, a second real image coincident with said first real image, said further optical means comprising a concave mirror positioned to receive and reflect said virtual image to form a focussed real image coincident with said first real image and constituting said second real image.

* * * * *